United States Patent Office 3,297,691
Patented Jan. 10, 1967

3,297,691
YELLOW PIGMENT
George Harrison, Jr., Wayne, N.J., Charles A. Kumins, Chappaqua, and Edmund N. Harvey, Jr., Scarsdale, N.Y., and George A. Weber, Wyckoff, N.J., assignors to Interchemical Corporation, New York, N.Y., a corporation of Ohio
No Drawing. Filed Mar. 24, 1965, Ser. No. 442,546
1 Claim. (Cl. 260—242)

This invention relates to a yellow pigment believed to be a copper chelate.

It has been found that the pigment of this invention has a lightfastness of at least 1000 hours, as measured in standard Fade-O-Meter evaluations. Also when the pigment was dispersed in a clear acrylic resin on a two-roll mill, the pigmented resin then being coated and cured on steel and on aluminum plates, the pigment showed excellent transparency. Bleeding tests were made with a number of common solvents; no bleeding was observed.

Example 1

The pigment may be conveniently prepared by heating to reflux temperature, 160° C., for two hours a mixture of 0.40 mole (74.8 g.) of benzoguanamine, 0.40 mole (69.6 g.) of 2-hydroxy-1-naphthaldehyde, 0.60 mole (120.0 g.) of cupric acetate monohydrate, and 3 liters of bis (2-ethoxyethyl) ether, the latter being the solvent. The batch was then cooled, 200 ml. of 95% ethanol added to complete precipitation, and the product was filtered until dry. It was next slurred in 95% ethanol, filtered, washed with ethanol and water, and dried at 65° C. overnight. 2-ethyl hexanol may also be used as solvent.

It is believed the product is a copper chelate that may be a polymer. Analytical data on the pigment indicate that the starting materials in the quantities used in the preparations were in stoichiometric proportions. For instance, analysis showed in four separate samples the following compositions.

|  | C | H | N | Cu | O |
|---|---|---|---|---|---|
| (1) _____percent__ | 54.48 | 2.71 | 15.06 | 20.29 | 7.46 |
| (2) _____do____ | 52.85 | 3.21 | 16.18 | 22.64 | 5.12 |
| (3) _____do____ | 52.28 | 2.54 | 15.69 | 20.33 | 9.16 |
| (4) _____do____ | 53.72 | 3.34 | 15.35 | 19.80 | 7.79 |
| Average_____do____ | 53.33 | 2.95 | 15.57 | 20.77 | 7.38 |

Oxygen was calculated by difference.

Example 2

A two-stage process is necessary when the reaction medium is to be xylene. First 0.40 mole (48.8 g.) of 2-hydroxy-1-naphthaldehyde and 0.20 mole (39.8 g.) of cupric acetate monohydrate were added to 600 ml. water. Then 60 ml. of 6 M aqueous sodium hydroxide solution were added to the batch, which was heated ½ hour at 60° C., cooled, filtered, washed twice with 95% ethanol, and dried. 56 g. of an olive green powder were thus recovered. 0.025 mole (10.1 g.) of this copper bis (2-hydroxy-1-naphthaldehyde), 0.025 mole (4.7 g.) of benzoguanamine, and 350 ml. of xylene were heated at reflux temperature for 2½ hours, cooled, filtered, washed with ethanol, and dried overnight at 60° C.

In all stages of the various preparations the reactions go smoothly. The yield was regularly 85–100%.

Benzoguanamine is 2,4-diamino-6-phenyl-s-triazine.

Parts and percentages are by weight unless otherwise stated.

When this pigment is dispersed in clear resin such as vinyl chloride-acetate copolymers, nitrocellulose, or acrylics, for instance, the color is rich golden transparent yellow and is thus useful when such dispersions are coated on bright metal to simulate the appearance of gold. The mass tone is a brownish yellow. Its behavior in vinyl chloride-acetate copolymers and in nitrocellulose is in marked contrast to that of the red chelate disclosed in application Serial No. 290,595, filed June 26, 1963. The red chelate color broke after 400 hours of standard exposure; the yellow chelate of this invention showed no change up to 600 hours, the test not having been carried beyond this point.

What is claimed is:

A yellow to brown colorant consisting essentially of the reaction product of 2 moles of 2,4-diamino-6-phenyl-s-triazine, 3 moles of copper acetate, and 2 moles of 2-hydroxy-1-naphthaldehyde, formed by heating these materials at reflux temperature until the separated and dried colorant has a chemical composition of about 20.77 parts of copper, 2.95 parts of hydrogen, 15.57 parts of nitrogen, 53.33 parts of carbon, and 7.38 parts of oxygen.

References Cited by the Examiner
UNITED STATES PATENTS
2,116,913  10/1938  Schmidt et al. ____ 260—240 XR
2,345,485  3/1944  Krzikalla et al. __ 260—240 XR JOHN D. RANDOLPH, *Primary Examiner.*